_(12)_ United States Patent
Broberg

(10) Patent No.: US 7,760,740 B2
(45) Date of Patent: Jul. 20, 2010

(54) MEDIA FORMATTING

(75) Inventor: David K. Broberg, Lafayette, CO (US)

(73) Assignee: Cable Television Laboratories, Louisville, CO (US)

( * ) Notice: Subject to any disclaimer, the term of this patent is extended or adjusted under 35 U.S.C. 154(b) by 719 days.

(21) Appl. No.: 11/563,753

(22) Filed: Nov. 28, 2006

(65) Prior Publication Data

US 2008/0127285 A1    May 29, 2008

(51) Int. Cl.
*H04L 12/56* (2006.01)
(52) U.S. Cl. .................................... 370/395.5
(58) Field of Classification Search ................. 725/105, 725/39, 97, 101–104, 45–46, 109–124; 709/231; 370/401, 419–420, 463
See application file for complete search history.

(56) References Cited

U.S. PATENT DOCUMENTS 7,430,222 B2 * 9/2008 Green et al. ................ 370/486
2005/0028206 A1 * 2/2005 Cameron et al. ............... 725/46
2006/0200576 A1 * 9/2006 Pickens et al. ............... 709/231
2007/0107026 A1 * 5/2007 Sherer et al. .................. 725/97
2007/0113246 A1 * 5/2007 Xiong ......................... 725/39
2007/0220575 A1 * 9/2007 Cooper et al. ................ 725/118
2009/0198827 A1 * 8/2009 Hughes ....................... 709/231
2009/0201929 A1 * 8/2009 Patel .......................... 370/390

* cited by examiner

*Primary Examiner*—Thai D Hoang
(74) *Attorney, Agent, or Firm*—Brooks Kushman P.C.

(57) ABSTRACT

Media formatting wherein media available from a media source is formatted for use with a media terminal. The formatting may include formatting the media to corresponding with operating characteristics of the terminal. The formatting may also include formatting one or more transmission and allowing the terminal to select the transmission having a matching/compatible format.

21 Claims, 2 Drawing Sheets

MEDIA FORMATTING

BACKGROUND OF THE INVENTION

1. Field of the Invention

The present invention relates to formatting media for use with media terminals in accessing the media.

2. Background Art

In the cable television environment, and other environments wherein electronic media is transported from one location to another, video, data, information, and other electronically transmissible messages may be transported according to any number of protocols, formats, standards, etc. Typically, the formatting associated with the media transmission is adapted to correspond with a media terminal used to interface and otherwise support user interaction with the media.

In the cable television environment, for example, video/television signal transmission formats, such as but not limited to MPEG-AVC (H.264), define a wide variety of tools that can be used to support the delivery of a wide variety of media types and formats. There are also a wide variety of special purpose coding tools that were developed for very specific applications, such as but not limited to tools to aid in the efficient coding of video conference material while other tools are more effective for broadcast television related content. To support all the tools available on the encoding side, requires that all the same tools be available on the decoding side.

There is a natural cost of complexity for both encoder and decoders, or other transmission pairs, i.e. media source and media terminal, to include unnecessary tools or capabilities for any given application. Not all services will necessarily benefit from all available tools. Therefore both encoders and decoders are being designed more cost effectively by omitting certain tools or coding profiles for certain markets. Standards processes to constrain or limit the required tools or profiles are being used to facilitate a common minimum set of tools or profiles for transmission pairs.

However such a constraint cannot foresee future business opportunities or competitive forces that may be better supported with additional tools or profiles. If the constraints are set too low, it precludes new business opportunities and unduly restrains the deployment of new services or technology. If the constraints are set too high, it adds unnecessary costs to the encoders and decoders for services that may not be deployed for years if at all. If receivers are deployed with the original set of constraints, they become a legacy that would not be able to support new capabilities needed to remain competitive.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
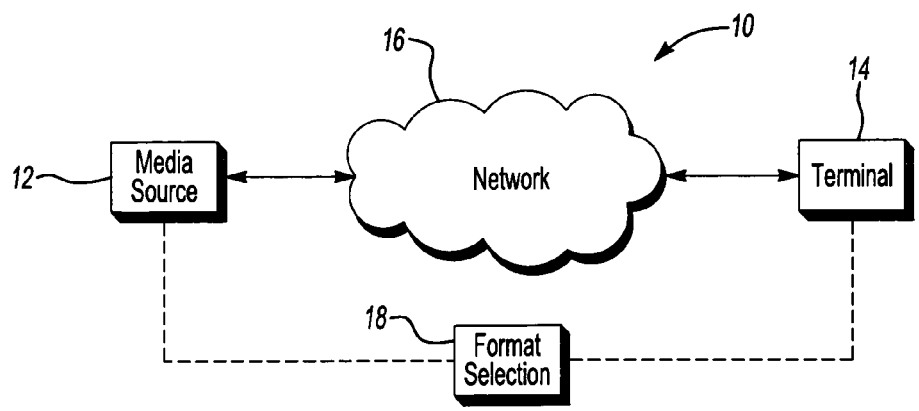
FIG. 1 illustrates a system for formatting media in accordance with one non-limiting aspect of the present invention

FIG. 1 illustrates a system 10 for formatting media in accordance with one non-limiting aspect of the present invention. The system 10 generally applies to any environment where media associated with a media source 12 may be delivered to a media terminal 14 having features to facilitate interfacing the media with a user or other entity. The system 10 may be adapted to any number of environments and configured to carry or otherwise facilitate transmitting any type of electronically transmissible media. The media may be transmitted over a network 16 or other communication medium (portable memory, etc.) having capabilities sufficient to deliver the media from one location to another.

The media source 12 may be associated with any type of media provider having capabilities to transmit media. For exemplary purposes only and without intending to limit the scope and contemplation of the present invention, the media source 12 may be associated with a multiple system operator (MSO) or other entity associated with providing services to any number of subscribers by way of any number of media terminals 14. Such MSO's may include but are not limited to cable, satellite, or broadcast television service providers, communication or cellular providers, internet service providers (data), and the like.

The network 16 may be associated with any type of network and include any combination of wireline and/or wireless features and devices to facilitate the electronic transmission of media. The network 16 may include multiple connections points and devices to facilitate media transmission, including but not limited to transmissions occurring through fixed media (CDs, DVDs, portable memory) and transmissions over electronic networks, such as but not limited to wireline and wireless networks. As such, the network 16 is intended to represent a method of transferring electronic media (portable memory) and/or an infrastructure for transferring electronic media (wireline/wireless network).

The terminal 14 may be associated with any type of terminal suitable for interfacing the media with the user and/or otherwise processing the media for subsequent use. The terminal may include but is not limited to a settop box (STB), digital video recorder (DVR), personal computer (PC), television (which may include embedded user interface and processing capabilities), outlet digital adapter (ODA), media terminal adapter (MTA), cable modem (CM), personal digital assistant (PDA), computer, mobile device (phone, computer, etc.), personal media device, audio/video player, and/or any other feature having capabilities for processing media. For exemplary purposes, a single terminal 14 is illustrated. The present invention is not so limited and fully contemplates the system including and supporting any number of terminals 14.

The system 10 may further include a format selection element 18 configured to facilitate formatting the media. The format selection element 18 is shown for exemplary purposes to include communication lines (phantom) between the media source 12 and/or the terminal 14. These connections are intended to represent that the ability of the selection device 18 to be included on the media source 12 and/or the terminal 14, or otherwise associated therewith. The selection device 18 may include an application or other logically functioning feature having capabilities to operate with one or both of the media source 12 and/or terminal 14 and the execute and/or facilitate execution of operations and processes associated with the present invention.

The format selection element 18 may be configured to assess operating parameters of the terminal 14 and to use such parameters in assessing media transmission format suitable for use with the terminal 14. The terminal 14 is shown to be a generic terminal 14 that may include any number of tools and profiles for processing any type of electronic media. The media may be transmitted according to an number of similar protocols, standards, and formats that may or may not cooperated with the operating parameters of the terminal. The selection element 18 may facilitate associate with the proper media formats with the proper terminals so as to facilitate access to the media.

The selection element 18 may be associated with the media source 12 and/or in communication therewith. It may poll, query, or otherwise communicate with the media terminal (and other non-illustrated terminals) to determine its operating parameters. The determined operating parameters may be collected and stored on the selection element 18 or on a memory associated therewith for subsequent use in matching formatting with the operating parameters of the media terminal(s) 14. For example, if the terminal 14 is a STB, SNMP protocols may be used to read the MIB of STB, which may then be used in conduction with the media source 12 (headend) to customize the media to match specific features or capabilities implemented in the STB 12 and reported in the MIB.

The selection element 18 may also be associated with the media terminal 14 and included thereon. It may be downloaded to the terminal 14 as an application or other feature configured to assess the operating parameters of the terminal 14. The operating parameters may be stored locally on the terminal 14 and/or transmitted to the media source 12. Optionally, the local storage may be advantageous in media broadcasting or other transmitting scenarios where the media source may transmit media according the multiple formats. Such a transmission may be accompanied with an announcement message associated with identifying the different formats. The announcement message may be interpreted by the selection element 18 and used by the selection element to tune or otherwise interact the terminal 14 with the media having a matching format. This approach may advantageous in decentralizing tracking and other support from the media source 12 of the media terminal(s) 14.

The matching of media transmission formats with terminal operating parameters may include analyzing and associating any number of operating parameters with related formatting variables. Such an inquiry may be dependent on the type of media being transmitted (content), the transmission medium (network, portable memory, etc.), terminal capabilities (processing, memory, etc.), and/or any number of other parameters, such as but not limited to software licenses, software versions, etc.

For exemplary purposes only and without intending to limit the scope and contemplation of the present invention, the media may relate to television signaling (live television, VOD, iTV, video/audio downloading, etc.) and related codecs, such as but not limited to MPEG-AVC (H.264), MPEG2, MPEG4, H.264, VC1, etc. The matching may then include tuning, downloading, or otherwise establishing communication between the media terminal and a transmission channel having the television signaling formatted (coded) according to a codec standard compatible or enabled on the terminal 14.

Figure 2:
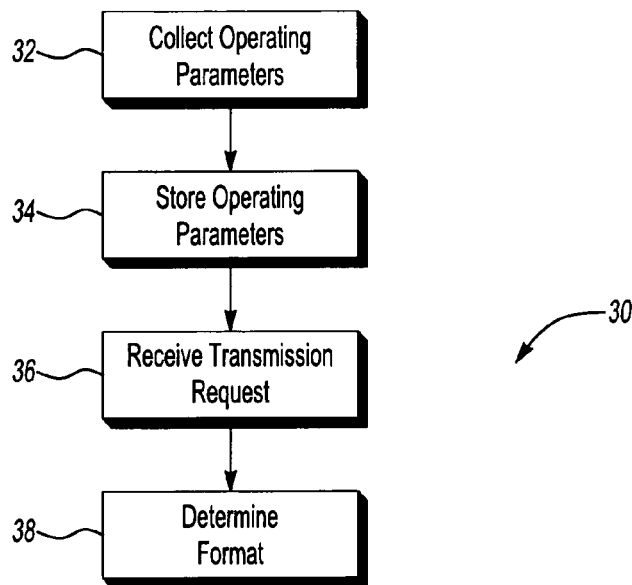
FIG. 2 illustrates a flowchart of a collection based method of formatting media in accordance with one non-limiting aspect of the present invention.
Figure 2:
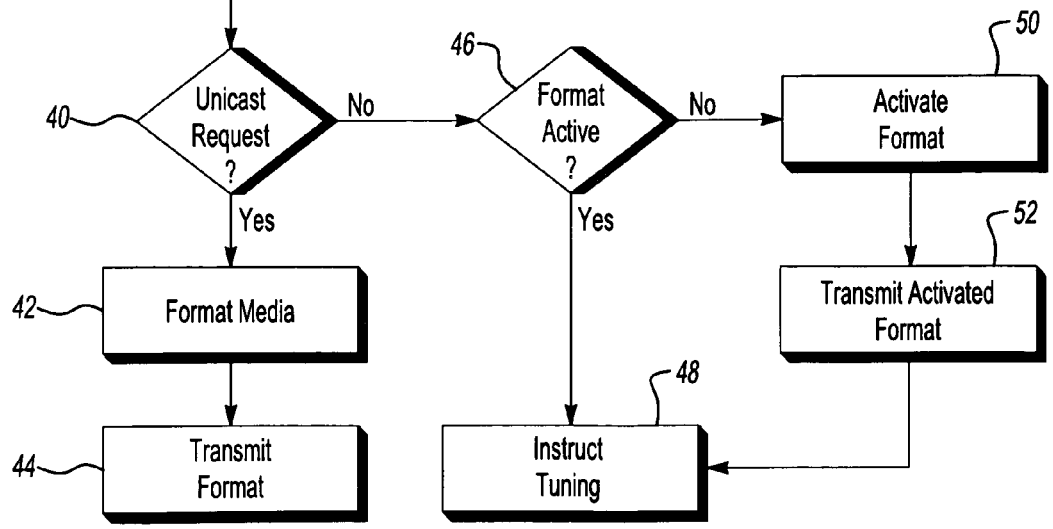

FIG. 2 illustrates a flowchart 30 of a collection based method of formatting media in accordance with one non-limiting aspect of the present invention. The method generally relates to collecting operating parameters for one or more media terminals and formatting media for transmission to the terminal(s) as a function of the collected operating parameters. The method applies to the transmission of any type of media and matching the formatting thereof and illustrated for exemplary purposes, and without intending to limit the scope and contemplation of the present invention, with respect to formatting television signaling for transmission to STBs or other terminals associate with descrambling or otherwise interfacing with the television signaling.

Block 32 relates to collecting operating parameters for one or more terminals. The operating parameters may be collected form the terminals through querying or polling operations instigated with the media source and/or format selection element and/or the terminals themselves may be programmed or instructed to periodically upload their current operating parameters. The format selection element may be configured to direct or otherwise facilitate collecting the operating parameters. Optionally, the operating parameters may be collected after the terminals are deployed to the customer location. This may helpful when collecting operating parameters associated with the transmission medium and/or other environmental aspects of the terminal that may not be easily assessed prior to deployment.

The collected operating parameters may relate to any number of operating conditions associated with the media terminal and may vary depending on the type of media terminal. As such, the present invention fully contemplates collecting any type of operating parameter and is not intended to be limited thereby. With respect to the exemplary description regarding the transmission of television/video related signaling, the collected operating parameters may include but are not limited to standards associated with formatting the signaling, such as but not limited to MPEG-AVC (H.264), MPEG2, MPEG4, VC1, etc.

Block 34 relates to storing the operating parameters on the terminals and/or at a location upstream from the terminals, such as but not limited to the storing the parameters at the media source and/or format selection element. A terminal identifier or other feature may be used to associate the terminals with their corresponding operating parameters. This information may stored in a database or other relation enterprise for subsequent retrieval and assessment. The storing may optionally include assessing or otherwise checking or verifying the operating parameters, such as but not limited to performing trouble-shooting and/or identifying terminals having legacy or out of date operating conditions of upgrade.

Block 36 relates to receiving a request for media transmission. The request generally relates to any request associated with the media source transmitting or otherwise providing media to the terminal. The request may be received according to any number of methodologies and communication mediums, including but not limited to signaling associated with tuning a STB to a particular television channel, signaling associated with ordering a program on demand (VOD), signaling associated with requesting media for downloading (IP), etc. The request may include the identifier included with the collected operating parameters.

Block 38 relates to determining a media format suitable for use with the terminal requesting the media. This may include assessing the operating parameters of the terminal with the transmission formats available from a media source having the requested media, such as to find a media source having a corresponding format, and/or simply determining one or more media formats supported on the terminal, such as for use in instructing media transmission from media sources having capabilities to vary/select their transmission formats.

Block 40 relates to determining whether the request related to media carried over unicast or multicast (broadcast) channels. Unicast type media requests may generally relate to media typically transmitted from the media source directly to the requesting terminal, such as but not limited to VOD, file downloads, etc. Multicast type media requests generally relates to media typically transmitted over multicast channels accessible to multiple terminals, such as but not limited to media typically broadcasted over cable, satellite, or broadcast television channels.

Block 42 relates to determining the media request to be a unicast media request. This type of request is destined for a single terminal such that Block 42 relates to formatting or selecting the desired media according to a media format compatible with the requesting terminal and transmitting the formatted/selected media to the terminal in Block 44. The format selection element may make this determination and in turn instruct the media device to format the media content for transmission to the requesting terminal. In this manner, the transmission of the media source may begin with formatting the requested media according to the matching format and/or simply locating previously formatted media.

Returning to Block 40, if the request relates to a non-unicast request, such as but not limited to a multicast/broadcast request, Block 46 is reached. Such a request may be received under any number of circumstances. One such circumstance may relate to switched television broadcasting platforms wherein a media source may broadcast a limited number of channels, typically the most commonly watched channels, until a request for a non-broadcasted channel is received (which may simply include tuning to a non-broadcasted channel).

Another such circumstance may relate to a switched format platform where the media source may include capabilities for broadcast television signals according to multiple formats, such as but not limited systems supporting legacy and newer STBs having different codec capabilities, whereby the media source broadcast content according to one of the formats until a requested for the same content is requested by STB that is unable to support the current format such that the media source then begins broadcasting content according the newly requested format (this may results in simultaneously multi-casting the same content according to different formats).

Block 46 relates to determining whether the format associated with the current media request is active, i.e., whether the media source is already actively transmitting the request media according to a format compatible with the requesting terminal. If a compatible transmission is active, Block 48 is reached and the terminal is instructed to tune to or otherwise access the multicast channel having the correspondingly formatted media. As noted above, this instruction may come from the format selection element instructing the terminal and/or the format selection terminal interrogating an announcement message send from the media source.

If the format associated with the current media request is not active, i.e., not currently being transmitted from the media source, Block 50 is reached and the media source is instructed to begin actively transmitting according to a matching format at Block 52. For channels shown live programming, this may include the media source simultaneously broadcasting the same content over multiple multicast channels, i.e., one channel to support previous request and a new channel to support the current/new request with both channels showing the same content.

Block 50 relates to activating the additional format and beginning its transmission. This may differ from the unicast method in that the unicast method may begin transmission from a beginning of the program whereas the multicast method may simply add additional formatting to the currently broadcasted format such that the new format would arise while the program was already in process, i.e., after its original broadcasting with the other format(s). The terminal is then instructed to tune to the appropriate multicast channel at Block 48.

The foregoing process may be repeated for each media request. Optionally, once the related media request are completed the formatting associate therewith may cease. With unicast and other requests where multiple formats may be simultaneously transmitted for the same media, one or more of the formats may be removed or ceased if the associated terminal becomes inactive or not longer desires the associated media, such as but not limited to the corresponding terminal (s) tuning away from the channel associated with the media.

Figure 3:
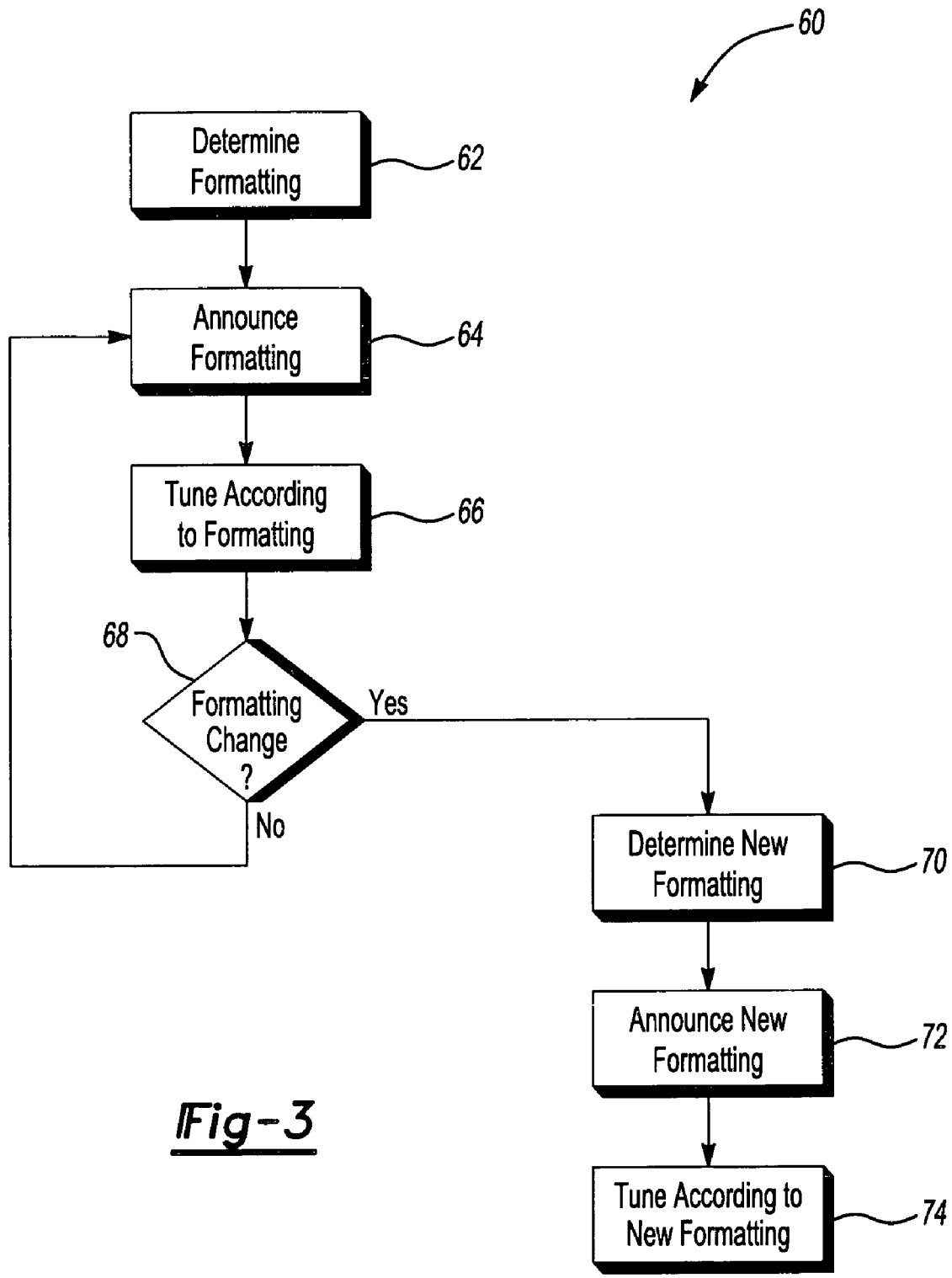
FIG. 3 illustrates a flowchart an announcement based method of formatting media in accordance with one non-limiting aspect of the present invention.

FIG. 3 illustrates a flowchart 60 an announcement based method of formatting media in accordance with one non-limiting aspect of the present invention. The method generally relates to transmitting media according to one or more formats and announcing or otherwise identify the format(s) such that the terminal is responsible for identifying and tuning to the format compatible with its operating parameters. The method applies to the transmission of any type of media and matching the formatting thereof and illustrated for exemplary purposes, and without intending to limit the scope and contemplation of the present invention, with respect to formatting television signaling for transmission to STBs or other terminals associate with descrambling or otherwise interfacing with the television signaling.

Block 62 relates to determining one or more formats for an associated transmission of media. This may include determining multiple formats for media to be transmitted simultaneously over the multiple channels, one or more formats for one or more unicast transmissions, one or more formats for a unicast transmission, and any other type of formatting selection required to support any number or type of media transmission. The media source or an operator thereof may determine the one or more formats. Optionally, information from the format selection element may be used to facilitate this determining, such as but not limiting selecting formats supported by one or more the media terminal as indicated by their corresponding operations characteristics, selecting the most popularly supported formats, etc.

Block 64 relates to announcing the formats of the media being transmitted from the media source, either for current transmission or future transmissions. This may include adding message and other features to the transmission and/or separately instructing the terminals, such as but not limited out-of-band message associated with updating channel maps and/or through some other instruction. The announcement may include relations, pointers, maps, or other features to coordinate the media with the associated format.

Block 66 relates to the terminal tuning to desired media as function of the formatting associated therewith. This may include the terminal selecting the proper formatting as function of its operating parameters and matching its operating parameters to the transmitted format. The terminal may then tune to the channel, download, or otherwise locate transmission stream having the correspondingly formatted media. In this manner, the terminal provide decentralized formatting control in so far as the media source may transmit the media without having to determine the appropriate format for the terminal(s).

Block 68 relates to a formatting change. The formatting change may relate to the media source transmitting additional formats and/or removing formats. This may occur if a request for a currently non-supported format is received, if a previous format is phased-out or otherwise unnecessary, and/or for any number of other reasons. If the same formatting is active, Block 64 is returned to and the announcement and corresponding steps remain the same. If the formatting changes, Blocks 70-74 relate to determining (Block 70), announcing (Block 72), and tuning to the format as a function of the new announcement (Block 74).

As noted above, one non-limiting aspect of the present invention may relate to a method by which a wide range of receiver/decoders (terminals) may be deployed, each with different levels of minimum requirements and for those to coexist in the market over a number of years while new services are deployed. The invention may rely on a two-way communication between a headend and the receiver/decoder that is used to allow a negotiation for the content that best matches the receiver/decoders capabilities. One non-limiting aspect of the present invention may relates to a method that enables source-based adaptation of digital video streams to match specific capabilities of receiver/decoders based on their specific implementation of options.

One non-limiting aspect of the present invention describes a solution that enables a transmitter of media to detect the capabilities or limitations of the receiver (decoder) and to use that information to send the media in a format that is most appropriate for that receiver.

This invention may benefit Cable MSOs as it may, but is not limited to, allow them to accelerate deployment of advanced codecs in MSO owned boxes, without the need to wait until all the minimum requirements for full interoperability are defined by industry standards or specifications; allows for the co-existence of those "legacy" boxes on the plant, while enabling the ability to support receivers designed for a retail environment; allows for a more competitive supply of receiving devices by lowering their cost by removing the requirement that all boxes support all possible formats; allows for lower cost receiver implementations to reduce costs for MSOs; and permits flexibility of the receiver implementations with an overall savings of bandwidth for the MSO since not every unicast stream needs to support the full resolution or highest bit rate. This invention may benefit Encoder manufacturers as it may, but is not limited to, permit greater freedom to innovate and the ability to reduce cost and complexity in the receiver by not including support for every function in every receiver.

One non-limiting aspect of the present relates to a method that may optionally include the service provider supporting the ability to send a dedicated content stream to each subscriber as a session-based on-demand service (unicast); subscriber terminals or set-top-boxes (STBs) having a limited range of available options based on the tool-box of the advanced codec standards; equipping the STB to implement SNMP protocol and to facilitate storing the available implementation options in a specific table located in the management information base (MIB); equipping the provider's network to use SNMP and can read the remote STB's MIB tables; prior to any sessions being established, having the headend servers check the contents of the subscribers STB MIB and determine the appropriate file-type (for example profile 3 or profile-4) to be sent to the subscriber; and having the headend establish the session with the subscriber using the exact file type needed by the STB.

One non-limiting aspect of the present relates to a method that may optionally include the service provider supporting the ability to send a variety of content streams to multiple subscribers simultaneously (multicast or switched broadcast); the subscriber's receiving terminal or set-top-box (STB) having implemented a limited range of available options based on the tool-box of the advanced codec standards; the STB being equipped to implement SNMP protocol and stores the available implementation options in a specific table located in the management information base (MIB); the service provider's network being equipped to use SNMP and can read the remote STB's MIB tables; the headend servers surveying the range of capabilities supported by active receivers (STBs) through the reading of the MIB files and sending only the stream types needed to support the options of active subscribers at any moment; if additional STBs come on line for that stream, their MIB files may be compared to determine if additional streams are necessary to support limitations of those devices; and if STBs tune away from the stream, their MIB may be compared to determine if the last subscriber of any given stream type has tuned away, and if so that stream is taken down and the bandwidth recovered for other uses.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of delivering a television program from a single media source to first and second settop boxes (STBs), the first and second STBs requiring the television program to be formatted respectively according to first and second codecs, the method comprising:

the media source identifying the first and second codecs operating on the first and second STBs based on information collected from management information bases (MIBs) of the first and second STBs;

from a beginning of the television program, the media source formatting the television program according to the first codec to support unicast delivery to the first STB, the unicast delivery characterized as being accessible solely to the first STB; and after the beginning of the television program, the media source formatting the television program according to the second codec to support multicast delivery to the second STB, the remainder of the television program being less than the entire length of the television program and the multicast delivery characterized as being accessible to at least both of the first and second STBs.

2. The method of claim 1 further comprising storing the collected information for use by the media provider in formatting subsequent television program for delivery.

3. The method of claim 1 further comprising delivering the television program over a first television channel for the unicast delivery and a second television channel for the multicast delivery.

4. The method of claim 1 further comprising the media provider formatting the television program according to a third codec and for inclusion within the multicast delivery such that different multicast channels carry multiple formats.

5. The method of claim 4 further comprising installing an application on the second and third STBs to select one of the multicast channels as a function of the formatting thereof so as to match the selected channel with the operation characteristics of the second and third STBs.

6. The method of claim 1 further comprising the media source formatting the television program according to the second codec only after receiving a request for the same from the second STB.

7. The method of claim 1 further comprising the media source terminating the unicast delivery in response to the first STB tuning away from the television program and terminating the multicast delivery in response to the second STB tuning away from the television program.

8. The method of claim 1 further comprising the media source collecting the information after the first and second STBs are deployed.

9. A method of broadcasting television programs from a source over a switched video platform to a number of terminals wherein at least a first and second one of the number of terminals having different operating characteristics, wherein the operating characteristics of the first and second terminals both support a first codec and only the operating characteristics of the second terminal supports a second codec, the switched video platform including a first number of television channels that are continuously transmitted regardless of whether one of the first number of television channels is being watched by one of the number of terminals and the switched video platform including an second number of television channels that are each individually transmitted only while being watched by at least one of the number of terminals, the method comprising:

the source formatting a television program from transmission over one of the first number of television channels and according to the first codec that is supported by the operating characteristics of at least both of the first and second terminals; and upon receipt of a request form the second terminal, the source also formatting the television program for transmission over one of the second number of television channels and according to the second codec that is not supported by the operating characteristics of the first terminal.

10. The method of claim 9 further comprising the source ceasing transmission of the television program over the one of the second number of television channels in response to the second terminal tuning away.

11. The method of claim 9 further comprising the source transmitting each of the first and the second number of the number of television channels to each of the first and the second terminals.

12. A system of formatting media for one or more media terminals configured to facilitate accessing the media, the system comprising:

a media source configured for formatting the media according to a number of available media formats;

at least one format selection element configured to relate the available media formats to operating characteristics of the one or more media terminals so as to facilitate access to the media as a function of the media formats associated therewith; and after the media source begins transmitting one particular piece of media according to a first format available for the operating characteristics of a first one of the media terminals, the media source subsequently beginning simultaneous transmission of the same particular piece of media according to a second format available for the operating characteristics of a second one of the media terminals.

13. The system of claim 12 wherein the format selection element is located remotely from the media terminals and configured to collect operating characteristics for the media terminals after the media terminal is deployed and further configured to communicate with the media source in order to facilitate formatting of the media to correspond with the operating characteristics of at least one of the terminals.

14. The system of claim 12 wherein the media source formats the media according to multiple formats and includes an announcement to announce the formats and wherein the format selection element is included on the terminals for use in selecting the media according to the announced media format and operating characteristics of the associated media terminal.

15. The system of claim 12 wherein the source transmits the particular piece of media over switched video platform where the first format is carried over a first channel regardless of whether the first channel is being watched and where the second format is carried over a second channel only when the second channel is being watched.

16. The system of claim 15 wherein the source transmits the first and second channels to both of the first and second media terminals.

17. The system of claim 12 wherein the source transmits the particular piece of media with the first format over a multicast channel to both of the first and second ones of the media terminals.

18. The system of claim 17 wherein the source transmits the particular piece of media with the second format over a unicast channel to the second one of the media terminals.

19. The system of claim 12 wherein the source is a single server.

20. The system of claim 19 wherein the first media terminal is a settop box (STB) configured to operate according to a first codec that is compatible with the first format.

21. The system of claim 20 wherein the second media terminal is a settop box (STB) configured to operate according to the first codec that is compatible with the first format and a second codec that is compatible with the second format, wherein the first media terminal is not compatible with the second codec.

* * * * *